(12) United States Patent
Rothman et al.

(10) Patent No.: US 8,103,908 B2
(45) Date of Patent: Jan. 24, 2012

(54) METHOD AND SYSTEM FOR RECOVERY OF A COMPUTING ENVIRONMENT DURING PRE-BOOT AND RUNTIME PHASES

(75) Inventors: Michael A. Rothman, Puyallup, WA (US); Vincent J. Zimmer, Federal Way, WA (US)

(73) Assignee: Intel Corporation, Santa Clara, CA (US)

( * ) Notice: Subject to any disclaimer, the term of this patent is extended or adjusted under 35 U.S.C. 154(b) by 705 days.

(21) Appl. No.: 11/966,093

(22) Filed: Dec. 28, 2007

(65) Prior Publication Data

US 2009/0172462 A1 Jul. 2, 2009

(51) Int. Cl.
*G06F 11/00* (2006.01)
*G06F 11/07* (2006.01)

(52) U.S. Cl. .................. 714/15; 714/23; 714/46; 714/57

(58) Field of Classification Search ..................... 714/15, 714/23, 46, 57
See application file for complete search history.

(56) References Cited

U.S. PATENT DOCUMENTS

| | | | | |
|---|---|---|---|---|
| 6,038,632 | A * | 3/2000 | Yamazaki et al. | 710/260 |
| 6,356,965 | B1 * | 3/2002 | Broyles et al. | 710/104 |
| 6,606,716 | B1 * | 8/2003 | Vrhel, Jr. et al. | 714/32 |
| 6,915,449 | B2 * | 7/2005 | Bantz et al. | 714/15 |
| 7,111,203 | B2 * | 9/2006 | Hu et al. | 714/36 |
| 7,170,498 | B2 * | 1/2007 | Huang | 345/172 |
| 7,178,053 | B2 * | 2/2007 | Ho | 714/5.1 |
| 7,447,819 | B2 * | 11/2008 | Ando | 710/260 |
| 7,500,146 | B2 * | 3/2009 | Asayama et al. | 714/26 |
| 2002/0162052 | A1 * | 10/2002 | Lewis | 714/36 |
| 2004/0172578 | A1 * | 9/2004 | Chen et al. | 714/15 |
| 2005/0050385 | A1 * | 3/2005 | Chen | 714/11 |
| 2007/0255934 | A1 * | 11/2007 | Dennis | 713/1 |
| 2008/0195836 | A1 * | 8/2008 | Muppirala et al. | 711/173 |

* cited by examiner

*Primary Examiner* — Joseph Schell
(74) *Attorney, Agent, or Firm* — Barnes & Thornburg LLP

(57) ABSTRACT

A method and system for recovery of a computing environment includes monitoring during a pre-boot phase and a runtime phase of a computing device for selection of a hot key sequence by a user and performing a recovery action in response to the selection of the hot key sequence by the user. The recovery action may be any one of a number of predetermined and/or selectable actions such as restoring system defaults, migrating memory, displaying a menu of options, setting various software flags, restarting or rebooting the computing device, and/or the like.

17 Claims, 4 Drawing Sheets

METHOD AND SYSTEM FOR RECOVERY OF A COMPUTING ENVIRONMENT DURING PRE-BOOT AND RUNTIME PHASES

BACKGROUND

End-user ability to perform self-recovery of a computing device from a system crash, virus, error, or other malfunction is typically limited by the end-user's experience, knowledge, as well as, the configuration of the computing device. For example, in computing devices designed for entry-level or emerging markets, built-in recovery resources/services may be limited or non-existent. Additionally, in some cases such as in emerging markets, support for the computing device may be limited to a support document, thereby forcing the end-user to attempt recovery from an error on his/her own.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION OF THE DRAWINGS

Figure 1:
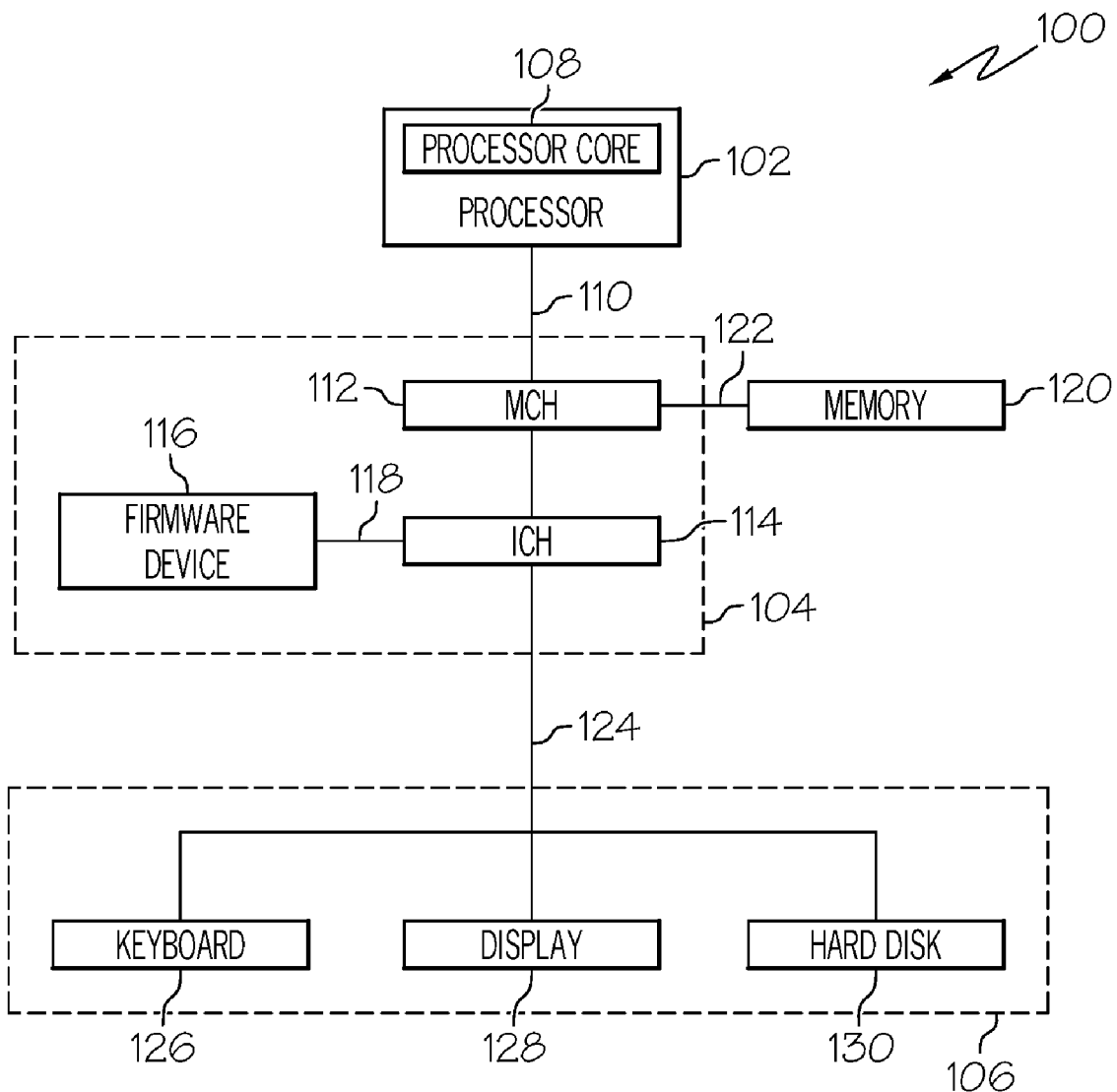
FIG. 1 is a simplified block diagram of a computing device.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the invention as defined by the appended claims.

In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present disclosure. It will be appreciated, however, by one skilled in the art that embodiments of the disclosure may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Embodiments of the invention may be implemented in hardware, firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; and others.

Referring now to FIG. 1, in one embodiment, a computing device 100 includes a processor 102, a chipset 104, and a plurality of peripheral devices 106. The computing device 100 may be embodied as any type of computing device such as, for example, a desktop computer system, a laptop computer system, a server or enterprise computer system, or a handheld computing device. In one particular embodiment, the computing device 100 is embodied as a low-cost computer having few features and designed for use in emerging markets. The processor 102 illustratively includes a single processor core 108. However, in other embodiments, the processor 102 may be embodied as a multi-processor having any number of processor cores. Additionally, computing device 100 may include additional processors having one or more processor cores.

The processor 102 is communicatively coupled to the chipset 104 via a number of signal paths 110. The signal paths 110 may be embodied as any type of signal paths capable of facilitating communication between the processor 102 and the chipset 104. For example, the signal paths 110 may be embodied as any number of wires, printed circuit board traces, via, bus, intervening devices, and/or the like. The chipset 104 includes a memory controller hub (MCH) or northbridge 112, an input/output controller hub (ICH) or southbridge 114, and a firmware device 116. The firmware device 116 is communicatively coupled to the input/output controller hub 114 via a number of signal paths 118. Similar to the signal paths 110, the signal paths 118 may be embodied as any type of signal paths capable of facilitating communication between the input/output controller hub 114 and the firmware device 116 such as, for example, any number of wires, printed circuit board traces, via, bus, intervening devices, and/or the like. The firmware device 116 is illustratively embodied as a memory storage device for storing Basic Input/Output System (BIOS) data and/or instructions and/or other information.

The memory controller hub 112 is communicatively coupled to a memory device 120 via a number of signal paths 122. Again, similar to the signal paths 110, the signal paths 122 may be embodied as any type of signal paths capable of facilitating communication between the memory controller hub 112 and the memory device 120 such as, for example, any number of wires, printed circuit board traces, via, bus, intervening devices, and/or the like. The memory devices 120 may be embodied as dynamic random access memory devices (DRAM), synchronous dynamic random access memory devices (SDRAM), double-data rate dynamic random access memory device (DDR SDRAM), and/or other volatile memory devices. Additionally, although only a single memory device is illustrated in FIG. 1, in other embodiments, the computing device 100 may include additional memory devices.

The chipset 104 is also communicatively coupled to the plurality of peripherals 106 via signal paths 124. Again, similar to the signal paths 110, 118, 122, the signal paths 124 may be embodied as any type of signal paths capable of facilitating communication between the chipset 104 and the peripherals 106 such as, for example, any number of wires, printed circuit board traces, via, bus, intervening devices, and/or the like. The peripherals 106 may include any number of peripheral devices including data storage devices, interfaces, and output devices. For example, as illustrated in FIG. 1, the peripheral devices may include a keyboard 126, a display 128, and a hard disk 130. The keyboard 126 includes a number of keys selectable by a user of the computing device 100 to provide one or more keystroke inputs to the computing device 100. The display 128 is usable to display information to the user during use of the computing device 100. The hard disk 130 is usable for the storage of data including, for example, operating systems, applications, and various data. In other embodiments, the computing device 100 may include additional or other peripheral devices depending upon, for example, the intended use of the computing device. Further, it should be appreciated that the computing device 100 may include other components, sub-components, and devices not illustrated in FIG. 1 for clarity of the description. For example, it should be appreciated that the memory controller hub 112 may include a video controller or interface for controlling the display 128 and the input/output controller hub 114 may include an interrupt controller for generating interrupt events.

In use, a user of the computing device 100 may select a hot key sequence from a number of keys of the keyboard 126 to cause the computing device 100 to recover from an error by performing one of a number of recovery actions. In some embodiments, the hot key sequence is embodied as a single key or keystroke of the keyboard 126 selectable by the user to cause the computing device to perform one or more recovery actions. In other embodiments, the hot key sequence may be embodied as two or more keys or keystrokes of the keyboard 126. In such embodiments, the hot key sequence may be embodied as a specific sequence of keys, which must be selected in a pre-determined order to cause the computing device 100 to perform the recovery action(s). For example, a user may be required to select the "Q" key followed by the "W" key to cause the computing device 100 to perform the recovery action(s). Additionally, the hot key or keys may be embodied as traditional keys, such as the numerical and/or alphabetical keys found on a typical computer keyboard, or may be embodied as a special purpose key designed for use only as a hot key for recovery of the computing device 100.

As discussed above, the computing device 100 performs one or more recovery actions in response to the user's selection of the hot key sequence. The recovery action or actions may be embodied as any action performed by the computing device 100 to recovery from an error. For example, in some embodiments, the recovery action may be embodied as or otherwise include rebooting the computer device 100, restoring system defaults such as operating system defaults, restoring or re-creating one or more files, migrating memory, or other recovery actions. In one particular embodiment, the recovery action is embodied as or otherwise includes restoring platform settings to a default or "safe" setting. Additionally, in some embodiments, the recovery action may include displaying a list of recovery options to the user. The user may then select one or more of the recovery options.

Figure 2:
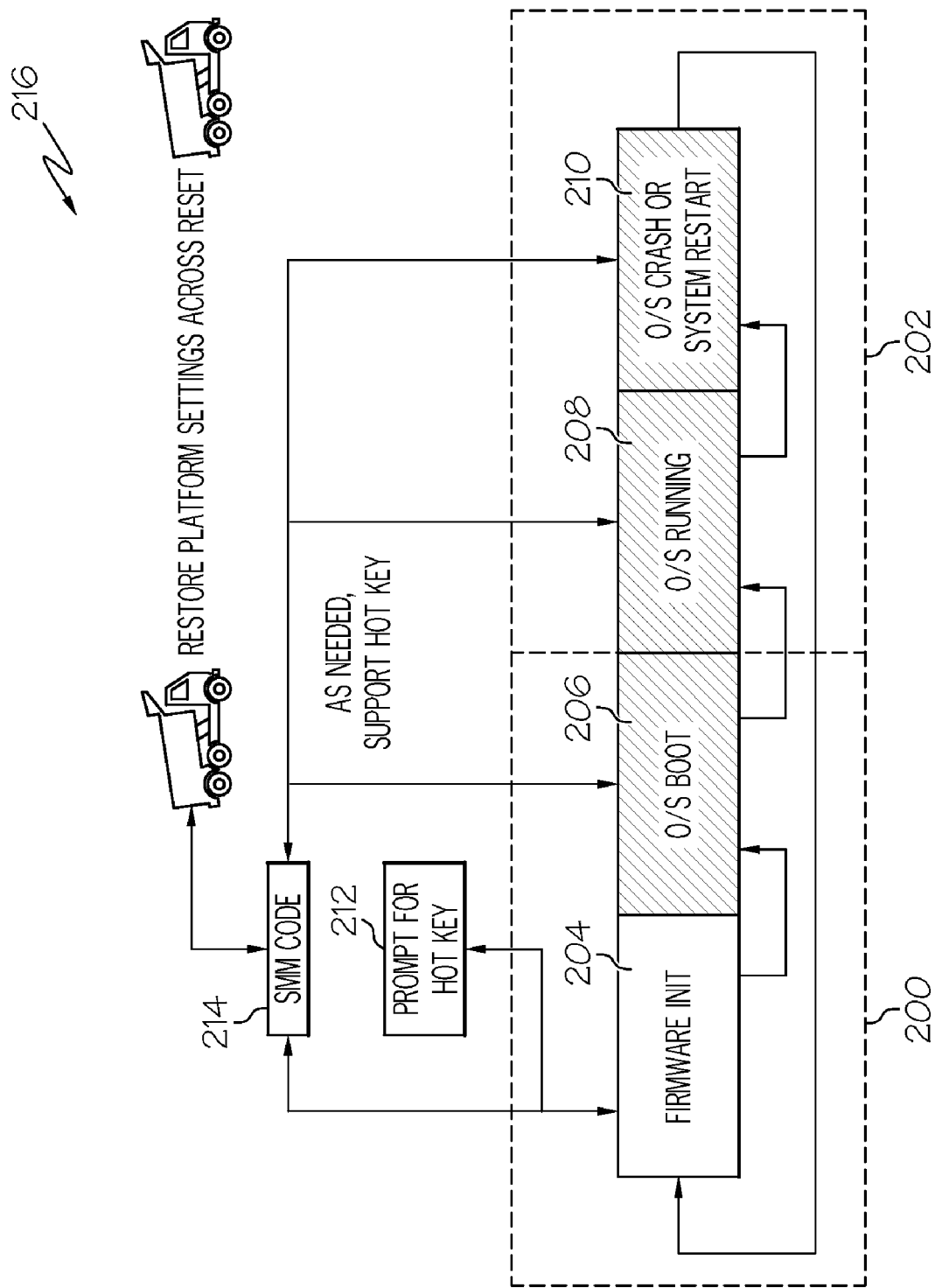
FIG. 2 is a simplified block diagram of system boot phases of a computing device supporting a hot key sequence recovery process.

The hot key sequence may be selected by the user during any operating phase of the computing device 100. For example, as illustrated in FIG. 2, during operation, the computing device 100 executes a pre-boot phase 200 and a runtime phase 202. The pre-boot phase 200 includes a firmware initialization phase 204 in which the platform firmware is initialized and an operating system boot phase 206 in which an operating system of the computing device 100 is initially booted or executed. Once the operating system is booted, the computing device 100 enters the runtime phase 202, which includes an operating system running phase 208. While the operating system is running, an error may sometimes occur that may "crash" the operating system or otherwise halt execution of the operating system causing the computing device to enter an error phase 210. During the error phase 210, the user may or may not be able to interact directly with the operating system.

During the firmware initialization phase 204, the user of the computing device 100 may be prompted for entry of the hot key sequence (see block 212). In response, the user may select the hot key sequence to cause the computing device 100 to perform the recovery action or actions. However, in addition, the user of the computing device 100 may select the hot key sequence at any time during the pre-boot phase 200 and/or the runtime phase 202 as needed. As such, the user may recover from an error of the computing device 100 during any phase of execution of the computing device 100. In response to the selection of the hot key sequence by the user, a system management interrupt (SMI) is generated. The system management interrupt is handled by the system management mode (SMM) 214 of the computing device 100, which may be embodied as one or more basic input/output system (BIOS) services of the computing device 100. In response to the system management interrupt, the system management mode may cause the computing device 100 to perform the one or more recovery actions 216, which may include restoration of the platform settings.

Figure 3:
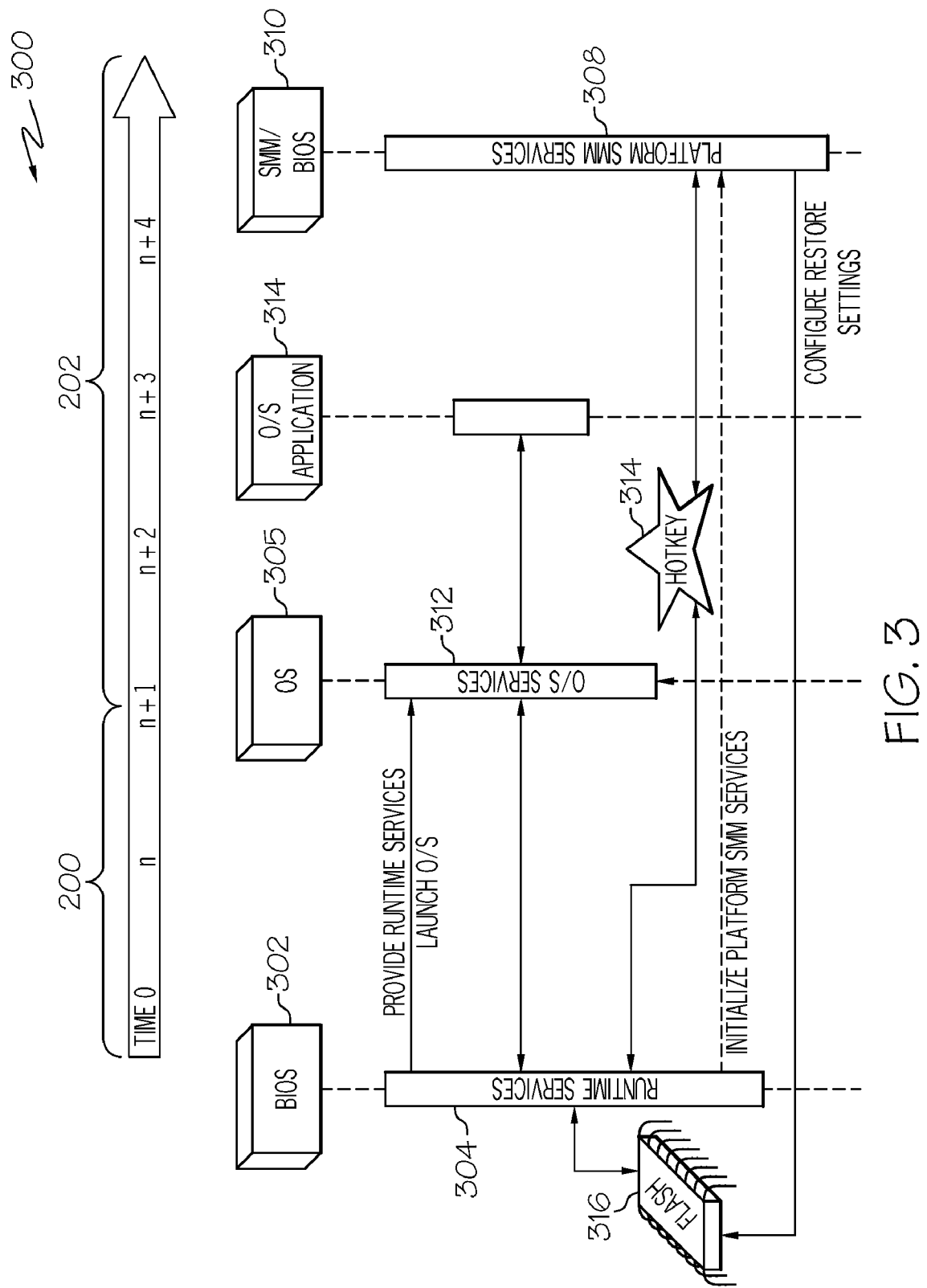
FIG. 3 is a simplified timeline of the system boot process of FIG. 2 wherein a hot key sequence recovery request has been received.

Referring now to FIG. 3, an illustrative execution timeline of the computing device 100 is illustrated. During the pre-boot phase 200, the basic input/output system 302 of the computing device 100 provides a number of runtime services 304 to launch an operating system 306. Additionally, the basic input/output system 302 initializes the platform system management mode services 308 of the system management mode 310. The operating system 306 includes a number of operating services 312, which may be used to launch one or more operating system applications 314. If the user selects a hot key sequence 314 during the execution of the operating system 306 (i.e., during the runtime phase 202), a system management interrupt is generated, which is handled by the system management mode services 308. In response, the system management mode services 308 causes the computing device 100 to perform one or more recovery actions. For example, as illustrated in FIG. 3, the system management mode services 308 may restore system settings from a memory device 316.

Figure 4:
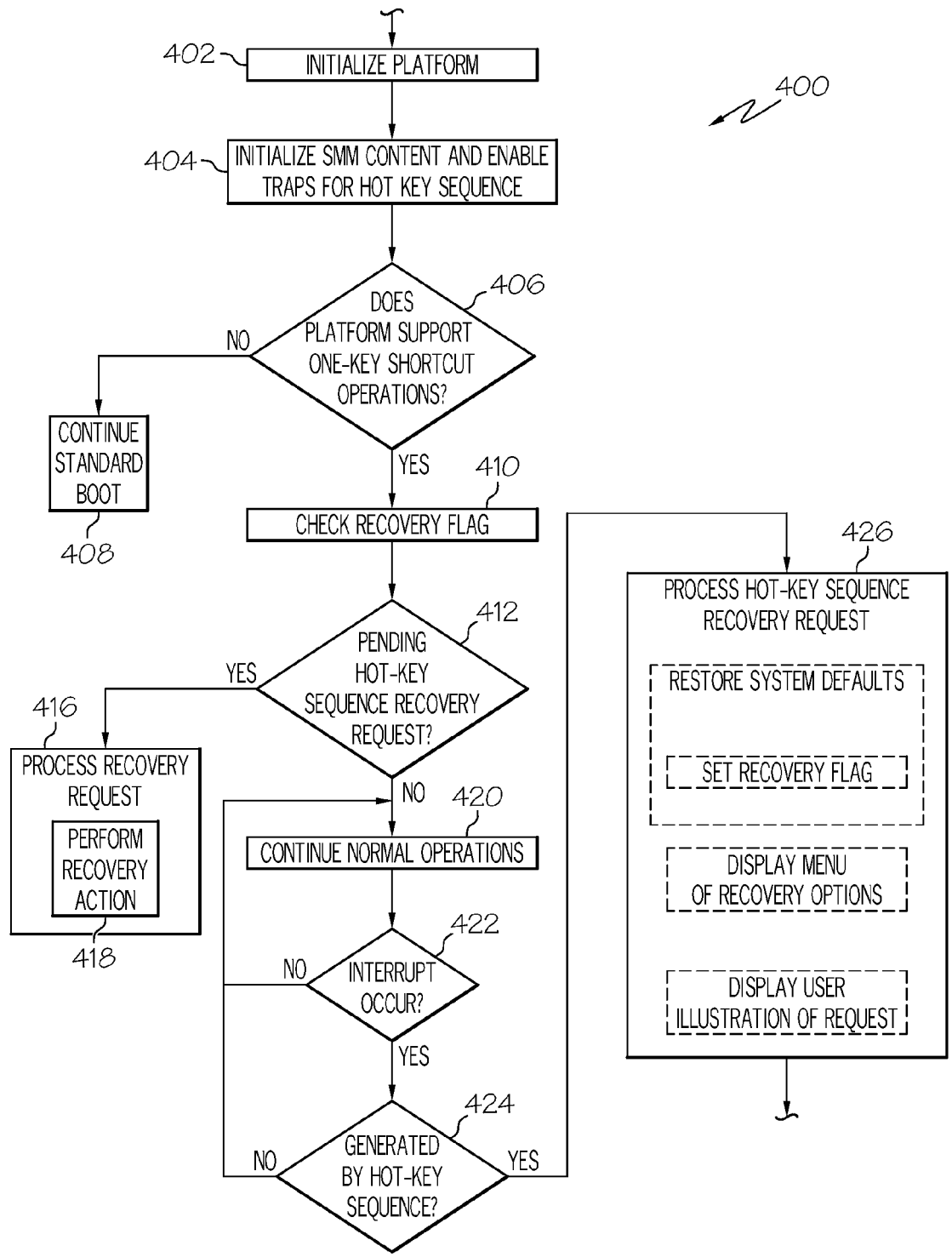
FIG. 4 is a simplified algorithm for recovery of a computing environment.

Referring now to FIG. 4, in one embodiment, an algorithm 400 for recovering computing device 100 from an error includes a block 402 in which the platform of the computing device 100 is initialized. For example, the memory 120 may be initialized in block 402. In block 404, the system management mode of the computing device 100 is initialized and a software trap for the hot key sequence is established. The software trap causes a system management interrupt to be generated in response to the user's selection of the hot key sequence. In the illustrative embodiment, the hot key sequence is embodied as a single key or keystroke, which is selectable by the user to cause the computing device 100 to perform a recovery action. However, as discussed above, the hot key sequence may be embodied as a plurality of keys or keystrokes in other embodiments.

In block 406, it is determined whether the platform of the computing device 100 supports one-key shortcut operations. If not, a standard boot process is executed in block 408. However, if the platform of the computing device 100 does support one-key shortcut operations, the a recovery flag is checked in block 410. As discussed in more detail below, the recovery flag may be set to indicate that the computing device 100 should perform one or more recovery actions at start-up or otherwise during the booting process (e.g., during the pre-boot phase 202). The recovery flag may be embodied one or more bits of a software register, a value or other data that may be stored in a reserved memory location, or other software flag.

In block 412 the recovery flag is analyzed to determined whether a hot key sequence recovery request is pending. That is, it is determined whether the software flag is set in block 412. If so, the computing device 100 processes the recovery request in block 416. To do so, the computing device 100 may perform one or more recovery actions 418. As discussed above, the recovery action or actions may be embodied as any action performed by the computing device 100 to recovery from an error. For example, in some embodiments, the recovery action may be embodied as or otherwise include rebooting the computer device 100, restoring system defaults such as operating system defaults, restoring or re-creating one or more files, migrating memory, or other recovery actions. In one particular embodiment, the recovery action is embodied as or otherwise includes restoring platform settings to a default or "safe" setting. Additionally, in some embodiments, the recovery action may include displaying a list of recovery options to the user from which the user may select one or more of the recovery options.

If, however, there is no pending hot key sequence recovery request, the computing device 100 continues normal operations in block 420, which may include execution of an operating system and any number of software applications. During the normal operations of the computing device 100, the computing device 100 monitors for the generation of a system management interrupt in block 422. If a system management interrupt is generated, it is determined whether the system management interrupt was generated in response to the hot key sequence in block 424. That is, it is determined whether the user has selected the hot key sequence and, as such, requests recovery of the computing device 100.

If it is determined that the user has selected the hot key sequence in block 424, the computing device 100 process the hot sequence recovery request in block 426. To do so, the computing device 100 may perform one or more recovery actions. Again, as discussed above, the recovery action or actions may be embodied as any action performed by the computing device 100 to recovery from an error. For example, the recovery action may include restoring system defaults, which may include setting the recovery flag such that the defaults are restored during the next start-up or pre-boot phase of the computing device 100. Additionally, the recovery action may include displaying a menu of recovery options to the user from which the user may select one or more recovery actions. The recovery action may also include displaying an illustration or other indicia to the user to indicate that the user has requested a recovery action. Further, additional or alternative recovery actions may be performed by the computing device 100 in response to the user's selection of the hot key sequence as discussed above. As such, it should be appreciated that the user may select the hot key sequence to cause the computing device 100 to perform one or more recovery actions to recover the computing device 100 or computing environment thereof from an error such as, for example, a "crashed" state.

While the disclosure has been illustrated and described in detail in the drawings and foregoing description, such an illustration and description is to be considered as exemplary and not restrictive in character, it being understood that only illustrative embodiments have been shown and described and that all changes and modifications that come within the spirit of the disclosure are desired to be protected.

What is claimed is:

1. A method comprising:
monitoring during a pre-boot phase of a computing device for selection of a predetermined hot key sequence entered by a user during the pre-boot phase, the predetermined hot key sequence being defined to indicate that the user desires recovery of the computing device from an error;
monitoring during a runtime phase of the computing device for selection of the predetermined hot key sequence entered by the user during the runtime phase;
generating a system management interrupt, in response to the user's selection of the predetermined hot key sequence, to cause the computing device to enter a system management mode; and
performing, via the system management mode, a recovery action to restore platform Basic Input/Output System (BIOS) settings of the computing device to default BIOS settings in response to the system management interrupt.

2. The method of claim 1, wherein the predetermined hot key sequence comprises at least one keyboard keystroke.

3. The method of claim 2, wherein the predetermined hot key sequence comprises multiple keyboard keystrokes.

4. The method of claim 1, wherein monitoring during the pre-boot phase for selection of the predetermined hot key sequence entered by the user during the pre-boot phase and monitoring during the runtime phase of the computing device for selection of the predetermined hot key sequence entered by the user during the runtime phase comprises monitoring continuously during each of the pre-boot phase and the runtime phase of the computing device for selection of the predetermined hot key sequence entered by the user.

5. The method of claim 1, wherein monitoring during the pre-boot phase and the runtime phase of the computing device for selection of the predetermined hot key sequence by the user comprises:
monitoring for an input from a keyboard; and
passing the input to an operating system being executed on the computing device if the input is not the predetermined hot key sequence.

6. The method of claim 1, wherein monitoring during the pre-boot phase and the runtime phase of the computing device for selection of the predetermined hot key sequence by the user comprises monitoring for selection of the predetermined hot key sequence using a BIOS service.

7. The method of claim 1, wherein the recovery action further comprises displaying a menu of recovery options to the user.

8. The method of claim 1, wherein the recovery action further comprises displaying indicia to the user to indicate that the user has entered recovery mode.

9. The method of claim 1, wherein the recovery action further comprises setting a software flag to indicate that the predetermined hot key sequence has been received.

10. A machine readable memory or storage medium comprising a plurality of instructions that in response to being executed result in a computing device that performs:
- monitoring during a pre-boot phase of a computing device for selection of a predetermined hot key sequence entered by a user during the pre-boot phase, the predetermined hot key sequence being defined to indicate that the user desires recovery of the computing device from an error;
- prompting the user of the computing device for entry of the predetermined hot key sequence during a firmware initialization phase of the pre-boot phase;
- monitoring during a runtime phase of the computing device for selection of the predetermined hot key sequence entered by the user during the runtime phase in response to the user not entering the predetermined hot key sequence during the pre-boot phase;
- causing the computing device to enter a system management mode in response to the user's entry of the predetermined hot key sequence during any of the firmware initialization phase, the pre-boot phase, or the runtime phase; and
- performing, via the system management mode, a recovery action to migrate memory of the computing device in response to entry of the predetermined hot key sequence by the user.

11. The machine readable memory or storage medium of claim 10, wherein the plurality of instructions further result in the computing device generating a system management interrupt in response to the user's entry of the predeteremined hot key sequence during any of the firmware initialization phase, the pre-boot phase, or the runtime phase and wherein performing the recovery action to migrate memory comprises performing the recovery action in response to the generated system management interrupt.

12. The machine readable memory or storage medium of claim 10, wherein the predetermined hot key sequence comprises at least one keyboard key.

13. The machine readable memory or storage medium of claim 10, wherein the recovery action further comprises displaying a menu of recovery options to the user.

14. The machine readable memory or storage medium of claim 10, wherein the recovery action further comprises displaying indicia to the user to indicate that the user has entered recovery mode.

15. The machine readable memory or storage medium of claim 10, wherein the recovery action further comprises setting a software flag to indicate that the predetermined hot key sequence has been received.

16. A computing device comprising:
- a display device;
- a processor; and
- a flash memory device having stored therein default Basic Input/Output System (BIOS) settings and a plurality of instructions, which when executed by the processor, cause the processor to:
- monitor during a pre-boot phase for selection of a predetermined hot key sequence entered by a user during the pre-boot phase, the predetermined hot key sequence being defined to indicate that the user desires recovery of the computing device from an error;
- monitor during a runtime phase for selection of the predetermined hot key sequence entered by the user during the runtime phase;
- generate a system management interrupt in response to the user's selection of the predetermined hot key sequence;
- enter a system management mode in response to the system management interrupt; and
- display on the display device, via the system management mode, a menu of recovery options that includes an option to restore platform BIOS settings of the computing device to the default BIOS settings stored in the flash memory device.

17. The computing device of claim 16, wherein the predetermined hot key sequence comprises a single keystroke.

\* \* \* \* \*